Patented Mar. 3, 1925.

1,528,077

UNITED STATES PATENT OFFICE.

JOSEPH L. ROSENFIELD, OF ALAMEDA, CALIFORNIA.

PEANUT BUTTER.

No Drawing.   Application filed October 26, 1922.   Serial No. 597,158.

*To all whom it may concern:*

Be it known that I, JOSEPH L. ROSENFIELD, a citizen of the United States, and a resident of Alameda, in the county of Alameda and State of California, have invented certain new and useful Improvements in Peanut Butter, of which the following is a specification.

This invention relates to peanut butter and is more particularly directed to that kind of butter described and claimed in my co-pending application, Serial No. 458,643, filed April 5, 1921, Patent No. 1,445,174, dated Feb. 13, 1923.

An object of the invention is the provision of a peanut butter basicly constituted of comminuted peanuts from which a certain percentage of the normal oil content has been removed and to which fundamental ingredient has been added an oil to replace the virgin oil removed so that the butter as a final product will have an oil content substantially no more or less than it originally had.

A further object of the invention is the provision of a nut butter having a base of comminuted peanuts, a certain percentage of the virgin peanut oil contained therein, and with such a percentage of some edible oil which is solid at ordinary house temperature and incorporated with the base and peanut oil, with the oil content of the product equal to the original oil content of the base.

Another object of the invention is the provision of a semi-solid plastic peanut butter in which the oil content is never prominent so that when the butter is permitted to stand no oil will rise to the top.

A further object of the invention is the provision of a peanut butter having a portion of its normal oil content replaced by an edible oil which is solid at ordinary house temperatures so that the butter as a product may be packed in paper cartons or small paper packages and continue in its semi-solid state under normal conditions.

Another object of the invention is the provision of a peanut butter which is capable of being molded into shape, which will not stick to the roof of the mouth, and which, when permitted to stand, will not show a gravitational separation of the ingredients therein.

The oil in an unbroken peanut is contained in small cells, the walls of which consist of cellulose. Any suitable process may be employed in the preparation of the peanuts to bring them into a comminuted state. Whatever process is selected in the earlier stages of the manufacture of peanut butter, part of the cells only are broken, liberating their oil.

Upon examination of comminuted peanuts under a microscope it will be found that there are aggregates of unbroken cells carrying their normal oil content and aggregates of broken cells with their oil liberated as free oil. This free oil, separated out by gravitation, is found upon the top of peanut butters which have been permitted to stand for some time. This free oil due to oxidation becomes rancid. The separation of the oil from the peanut base is due to the difference in the specific gravities of the oil and the base and this separation is aided by the fact that the free oil has a melting point below the ordinary room temperature.

It was found by analysis that the original oil content of a mass of peanut butter which is formed in the ordinary manner would be about 50.2% and that the range of percentages of the oil freed in the process of comminuting the peanuts will be between 11% and 25% with an average of about 18%.

As described in my co-pending application, a portion of the normal oil content of the comminuted peanuts was removed, hydrogenated and returned to the batch and thoroughly incorporated therein. The hydrogenated oil employed is in a substantially semi-solid state and when mixed with the peanut base from which the oil has been previously extracted, forms a semi-solid plastic peanut butter which will not melt at ordinary temperatures or permit gravitational separation of any of the oils from the peanut butter.

Instead of the use of the hydrogenated oil it was found that other edible oils or fats such as cocoanut oil and the like may be employed to replace a portion of the oil which is normally freed in the process of comminuting the nuts, and the edible oil or fat which is employed in the replacement must be capable of being solid at ordinary house temperatures otherwise the ordinary room temperature would not prevent separation of a quantity of the oil from the peanut butter. It must be borne in mind that only those oils or fats may be practically employed which are edible.

While I have stated that the peanut butter manufactured according to the present invention is capable of being packed in paper cartons, it is to be understood that the butter may be packed in any kind of container suitable for the purpose. Where the butter is put up in containers other than paper, it will not be necessary to bring the product to a state of plasticity. The edible oil or fat which replaces a portion of the normal oil content of the comminuted peanuts provides a permanent binding for the salt uniformly throughout the mass and prevents gravitational separation of the salt from the product. Again, the replacement of a portion of the normal oil content by the edible oil or fat will permit of a finer grinding of the peanuts than has been formerly considered wise. Under the processes in the manufacture of the ordinary peanut butter a very fine grinding of the peanuts will cause excessive number of oil cells being broken up and too free liberation of the oil content. The products which are formed from very finely ground peanuts will show a very rapid separation of the ingredients.

The product manufactured according to the present invention is essentially different from other nut butters in that the character of the oil content is under absolute control.

The term "base" as employed throughout the specification and claims is used in the sense of the ordinary residual cake but the base contains a slightly greater percentage of oil than the ordinary cake which has been pressed for the purpose of extracting its oil.

While it is my intention to replace a portion of the normal oil content of the comminuted peanuts by an equal portion of an edible oil or fat which is a solid at ordinary temperature whereby the normal oil content is maintained, I wish it to be understood that for practical purposes a greater or less quantity of oil or fat may within limits replace the extracted oil without materially affecting the product and whereby the normal oil content is not precisely retained.

What I claim is:

1. A nut butter adapted to remain in a semi-solid state at ordinary room temperature comprising a homogeneous mass of comminuted peanuts having a portion of the normal oil content replaced by cocoanut oil.

2. An inadhesive plastic nut butter comprising a homogeneous mass of comminuted peanuts having a portion of the normal oil content replaced by an edible oil or fat which is solid at ordinary room temperature.

JOSEPH L. ROSENFIELD.